(12) United States Patent
Nakanishi et al.

(10) Patent No.: US 9,752,936 B2
(45) Date of Patent: Sep. 5, 2017

(54) TEMPERATURE SENSOR

(71) Applicant: NGK SPARK PLUG CO., LTD., Nagoya-shi, Aichi-ken (JP)

(72) Inventors: Hiroaki Nakanishi, Kasugai (JP); Seiji Oya, Niwa-gun (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 258 days.

(21) Appl. No.: 14/748,423

(22) Filed: Jun. 24, 2015

(65) Prior Publication Data
US 2015/0377712 A1 Dec. 31, 2015

(30) Foreign Application Priority Data
Jun. 25, 2014 (JP) ................... 2014-130343

(51) Int. Cl.
*G01K 7/00* (2006.01)
*G01K 1/08* (2006.01)

(52) U.S. Cl.
CPC ........... *G01K 1/08* (2013.01); *G01K 2205/04* (2013.01)

(58) Field of Classification Search
USPC ........................................ 374/183, 185, 208
See application file for complete search history.

(56) References Cited

U.S. PATENT DOCUMENTS

| | | | | |
|---|---|---|---|---|
| 6,305,841 B1 * | 10/2001 | Fukaya | ................... | G01K 7/22 374/185 |
| 6,639,505 B2 * | 10/2003 | Murata | ................... | G01K 7/22 338/25 |
| 6,854,882 B2 * | 2/2005 | Chen | ................... | G01K 13/002 374/163 |
| 6,997,604 B2 * | 2/2006 | Hanzawa | ............... | G01K 13/02 140/149 |
| 7,553,078 B2 * | 6/2009 | Hanzawa | ................. | G01K 1/08 338/22 R |
| 8,668,383 B2 * | 3/2014 | Timans | ................ | G01K 11/125 250/338.1 |
| 8,672,541 B2 * | 3/2014 | Ito | ............................ | G01K 1/08 374/141 |
| 8,702,305 B2 * | 4/2014 | Yokoi | ..................... | G01K 1/08 338/22 R |

(Continued)

FOREIGN PATENT DOCUMENTS

JP 2006-234632 A 9/2006

*Primary Examiner* — Mirellys Jagan
(74) *Attorney, Agent, or Firm* — Stites & Harbison, PLLC; Jeffrey A. Haeberlin

(57) ABSTRACT

In a temperature sensor, two seal members seal the open opposite ends of a cladding member (a forward end and a rear end), so that water absorption by an insulator of a sheath member can be restrained. The seal members are formed to have an insulation resistance equal to that of a conductor-fixing material. Therefore, even when the temperature sensor is used in a high-temperature environment, the insulation performance of the seal members does not become lower than the insulation performance of the conductor-fixing material, so that the formation of a leakage current path can be suppressed. According to the temperature sensor, the electrical property of a temperature sensitive element can be sensed accurately, and a reduction in the accuracy of temperature sensing can be restrained.

4 Claims, 5 Drawing Sheets

(56) References Cited

U.S. PATENT DOCUMENTS

| | | | | |
|---|---|---|---|---|
| 8,771,559 | B2* | 7/2014 | Watanabe | C04B 35/016 252/519.13 |
| 8,864,375 | B2* | 10/2014 | Abe | G01K 1/08 374/144 |
| 2002/0131477 | A1* | 9/2002 | Kurano | G01K 7/22 374/185 |
| 2002/0172258 | A1* | 11/2002 | Adachi | G01K 7/22 374/185 |
| 2008/0205484 | A1* | 8/2008 | Toudou | G01K 1/08 374/185 |
| 2009/0016409 | A1* | 1/2009 | Mizoguchi | C01G 45/125 374/185 |
| 2014/0092940 | A1* | 4/2014 | Suzuki | G01K 7/22 374/185 |
| 2015/0308903 | A1* | 10/2015 | Sohn | G01K 7/22 374/185 |
| 2015/0316422 | A1* | 11/2015 | Oya | G01K 13/02 374/185 |
| 2016/0041041 | A1* | 2/2016 | Nomura | G01K 1/10 374/185 |

* cited by examiner

| Name | Components [wt%] | | | |
|---|---|---|---|---|
| | SiO$_2$ | Al$_2$O$_3$ | MgO | CaO |
| Aluminosilicate glass | 58.0 | 20.0 | 5.0 | 17.0 |

TEMPERATURE SENSOR

CROSS REFERENCE TO RELATED APPLICATIONS

The present application claims priority from Japanese Patent Application No. 2014-130343, which was filed on Jun. 25, 2014, the disclosure of which is herein incorporated by reference in its entirety.

BACKGROUND OF THE INVENTION

Field of the Invention

The present invention relates to a temperature sensor for sensing temperature.

Description of Related Art

One example of the temperature sensor for sensing temperature is a temperature sensor including a temperature sensitive element and a sheath member (Patent Document 1).

In this temperature sensor, the temperature sensitive element is electrically connected to conductors of the sheath member.

Examples of the temperature sensitive element include an element including a metallic or platinum resistor whose electrical property (electric resistance) changes with temperature, and a thermistor element including a conductive oxide sintered body whose electrical property (electric resistance) changes with temperature.

The sheath member includes the conductors electrically connected to the temperature sensitive element, an insulator that surrounds the conductors, and a metallic cladding member that is formed into a tubular shape so as to cover the insulator.

The cladding member is formed into a tubular shape and is open at opposite ends in its lengthwise direction. Specifically, the insulator is exposed to the outside at the opposite ends of the cladding member.

RELATED ART DOCUMENTS

Patent Document 1 is Japanese Patent Application No. 2006-234632.

BRIEF SUMMARY OF THE INVENTION

If the insulator included in the sheath member absorbs moisture, the insulation resistance of the insulator may lower.

When the insulation resistance of the insulator lowers as described above, the insulator may form a leakage current path. In this case, the electrical property of the temperature sensitive element cannot be sensed accurately, and this causes a reduction in the sensing accuracy of the temperature sensor.

To suppress entry of water into the insulator included in the sheath member (moisture absorption by the insulator), it is contemplated to dispose seal members that block water permeation at the forward and rear ends of the cladding member of the sheath member.

However, even when the seal members are disposed, the insulation performance of the seal members deteriorates significantly in a high-temperature environment unless the insulation resistances of the seal members are taken into consideration. In this case, the seal members may form leakage current paths different from a normal current path formed by the conductors of the sheath member. Examples of the leakage current paths include a path in which the conductors are electrically connected to each other through a seal member and a path in which the conductors are electrically connected to the cladding member through a seal member. When such a leakage current path is formed and a leakage current flows therethrough, there arises the possibility that the electrical property of the temperature sensitive element fails to be sensed accurately, which results in a reduction in the accuracy of temperature sensing. Particularly, when the temperature sensitive element has the characteristic that its electric resistance increases with temperature, the electric resistance of the temperature sensitive element increases with the ambient temperature, but the insulation resistances of the seal members lower. Therefore, when the insulation performance of the seal members becomes low, the possibility that the seal members form leakage current paths becomes high.

Accordingly, an object of the present invention is to provide a temperature sensor which restrains moisture absorption by the insulator included in the sheath member and also restrains a reduction in the accuracy of temperature sensing even when the temperature sensor is used in a high-temperature environment.

According to an aspect of the present invention, a temperature sensor includes: a temperature sensitive element having an electrical property that changes with temperature; a sheath member extending in a lengthwise direction of the temperature sensor and including at least one conductor electrically connected to the temperature sensitive element directly or through another member; and a covering member formed mainly of glass and surrounding or covering a junction between the conductor and the temperature sensitive element or a junction between the another member and the temperature sensitive element. The sheath member also includes an insulator, a cladding member, and seal members.

The insulator is formed of an insulating material and surrounds the conductor extending in the lengthwise direction. The cladding member is made of a metal, covers the insulator, and is open at opposite ends in the lengthwise direction. The seal members seal the open opposite ends of the cladding member in a state in which the conductor extends outward from the cladding member through the seal members.

The seal members are formed so as to have an insulation resistance equal to or greater than that of the covering member. The temperature sensitive element has the characteristic that its electric resistance increases with temperature.

In this temperature sensor, the seal members seal the open opposite ends of the cladding member, so that water absorption by the insulator of the sheath member can be restrained.

Particularly, in the present invention, the temperature sensitive element has the characteristic that its electric resistance increases with temperature. Therefore, when the temperature sensor is used in a high-temperature environment, the electric resistance of the temperature sensitive element becomes high. In this case, if the insulation resistances of the seal members lower as the ambient temperature increases and become lower than the insulation resistance of the covering member, the seal members are highly likely to form leakage current paths.

However, the present temperature sensor includes the seal members formed to have an insulation resistance equal to or greater than that of the covering member, so that the formation of a leakage current path can be suppressed.

Therefore, in the present temperature sensor, water absorption by the insulator of the sheath member can be restrained, and the formation of a leakage current path in the insulator and the seal members can be suppressed, so that the electrical property of the temperature sensitive element can be sensed accurately.

According to the temperature sensor of the present invention, moisture absorption by the insulator included in the sheath member is restrained, and a reduction in the accuracy of temperature sensing can be restrained even when the temperature sensor is used in a high-temperature environment.

The seal members may be members that seal the open opposite ends of the cladding member in a watertight manner. Examples of such seal members include members formed of materials, such as glass materials and water-repellent ceramics, which resist water permeation; and dense ceramic members with no communicating pores. These seal members can restrain water absorption by the insulator of the sheath member in a reliable manner.

In the above-described temperature sensor, the insulator of the sheath member may be formed of magnesia (MgO).

Magnesia has the characteristic that it easily absorbs water. Therefore, the insulation resistance of the insulator formed of magnesia is likely to lower as a result of absorption of water.

However, the present temperature sensor is provided with the seal members described above, so that water absorption by the insulator of the sheath member can be restrained. Therefore, although relatively low-cost magnesia is used for the insulator, the electrical property of the temperature sensitive element can be sensed accurately.

In the above-described temperature sensor, the seal members of the sheath member may be formed mainly of glass.

The glass material resists water permeation. Therefore, by covering the open opposite ends of the cladding member with the glass material, water absorption by the insulator can be restrained. By controlling the components forming the glass, the insulation resistances of the seal members can be controlled to be equal to or greater than the insulation resistance of the covering member.

The phrase "the seal members are formed mainly of glass" means that, among the materials forming the seal members, glass is of the largest amount.

The above temperature sensor may further comprise a mounting member that supports the sheath member and has a contact surface that is to come into contact with an installation position for the temperature sensor.

In the lengthwise direction of the temperature sensor, the side on which the temperature sensitive element is disposed is defined as a forward end side, and the side opposite the forward end side is defined as a rear end side. In this case, the sheath member may be held by the mounting member such that a forward end of the cladding member that is one of the opposite ends thereof located on the forward end side is disposed forward of the contact surface of the mounting member and that a rear end portion of the cladding member that is the other one of the open opposite ends thereof located on the rear end side is disposed rearward of the contact surface of the mounting member.

Among the seal members, the forward seal member disposed at the forward end of the cladding member may have an insulation resistance equal to or greater than that of the rear seal member disposed at the rear end of the cladding member.

The present temperature sensor is configured such that external heat received by its forward end is transferred to an external member through the contact surface of the mounting member. Therefore, the temperature of the temperature sensor in a region located rearward of the mounting member is lower than that in a region located forward of the mounting member.

Specifically, since the temperature of a portion of the temperature sensor located forward of the mounting member is higher than the temperature of a portion of the temperature sensor located rearward of the mounting member, the forward seal member is disposed in a higher-temperature environment than the rear seal member.

In view of the above, the forward seal member may be formed to have an insulation resistance equal to or greater than that of the rear seal member. This suppresses the formation of a leakage current path in the forward seal member disposed in a higher-temperature environment.

Therefore, in the present temperature sensor, since the formation of a leakage current path in the seal members can be suppressed, the electrical property of the temperature sensitive element can be sensed accurately, and a reduction in the accuracy of temperature sensing can be restrained.

According to the temperature sensor of the present invention, moisture absorption by the insulator included in the sheath member is restrained through provision of the seal members, and a reduction in the accuracy of temperature sensing can be restrained even when the temperature sensor is used in a high-temperature environment.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE INVENTION

Embodiments to which the present invention is applied will next be described with reference to the drawings.

The present invention is not limited to the embodiments described below, and it will be appreciated that the present invention can be implemented in various forms so long as they fall within the technical scope of the invention.

1. FIRST EMBODIMENT

1-1. Overall Structure

A temperature sensor 1 used to sense the temperature of exhaust gas from an internal combustion engine of, for example, an automobile will be described as a first embodiment.

This temperature sensor 1 is attached to, for example, a flow pipe such as an exhaust pipe of an internal combustion engine. The forward end portion of the temperature sensor 1 is disposed inside the flow pipe through which a measurement target gas (exhaust gas) flows, and the temperature of the measurement target gas is thereby sensed.

Figure 1:
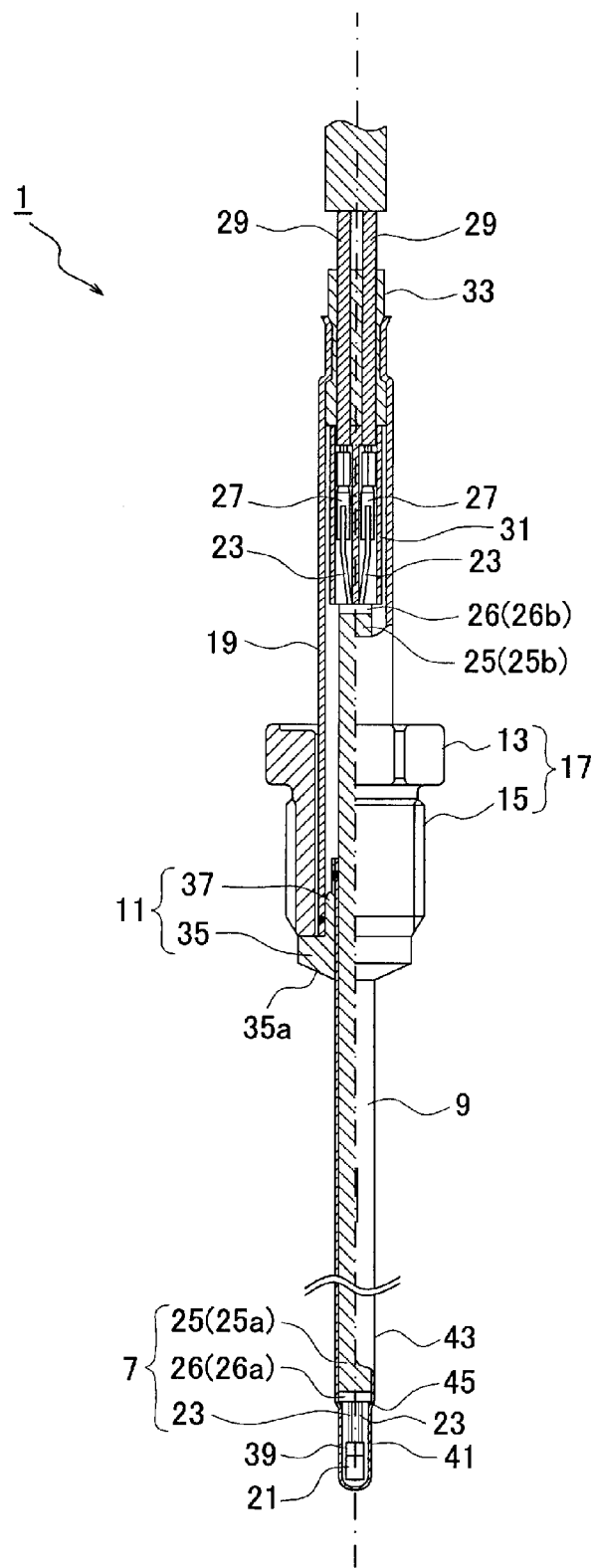
FIG. 1 is a partially cutaway cross-sectional view illustrating the structure of a temperature sensor.
Figure 2:
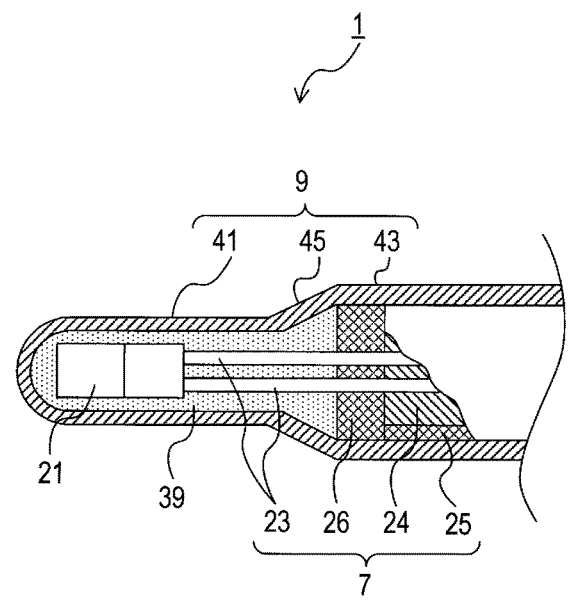
FIG. 2 is an enlarged cutaway cross-sectional view illustrating a forward end portion, with respect to an axial direction, of the temperature sensor.

FIG. 1 is a partially cutaway cross-sectional view illustrating the structure of the temperature sensor 1. FIG. 2 is an enlarged cutaway cross-sectional view illustrating a forward end portion, with respect to an axial direction, of the temperature sensor 1.

The axial direction is the lengthwise direction of the temperature sensor 1 and corresponds to the vertical direction in FIG. 1. The forward end side of the temperature sensor 1 is the lower side in FIG. 1, and the rear end side of the temperature sensor 1 is the upper side in FIG. 1.

The temperature sensor 1 includes a sheath member 7, a metal tube 9 (housing 9), a mounting member 11, a nut member 17, a sleeve 19, and a temperature sensitive element 21.

As shown in FIG. 2, the sheath member 7 includes a pair of sheath conductors 23 (electrode wires 23), an insulator 24 surrounding the pair of sheath conductors 23, a metallic cladding member 25 that covers the insulator 24, and two seal members 26 (see FIG. 1) disposed at the forward and rear ends of the cladding member 25, respectively. The detail of the sheath member 7 will be described later.

The metal tube 9 is formed of a corrosion-resistant metal (for example, a stainless steel alloy such as SUS310S, which is also a heat resistant metal). The metal tube 9 is formed by deep-drawing a steel plate into a tubular shape extending in the axial direction with the forward end of the tube closed and its rear end open.

As shown in FIG. 2 on an enlarged scale, the metal tube 9 has a forward small-diameter portion 41 having a small diameter, a rear large-diameter portion 43 having a diameter greater than the diameter of the small-diameter portion 41, and a step portion 45 disposed between the small-diameter portion 41 and the large-diameter portion 43. The step portion 45 is formed such that its diameter gradually increases from the small-diameter portion 41 toward the large-diameter portion 43.

As shown in FIG. 1, the mounting member 11 has a protruding portion 35 protruding radially outward and a rear sheath portion 37 located rearward of the protruding portion 35 and extending in the axial direction. The mounting member 11 surrounds the outer circumferential surface of a rear end portion of the metal tube 9 and is welded to the metal tube 9 to thereby hold the metal tube 9. The protruding portion 35 has a forward contact surface 35a that is to come into contact with an installation position for the temperature sensor 1.

The nut member 17 has a hexagonal nut portion 13 and a threaded portion 15. The sleeve 19 is fitted onto a rear end portion of the mounting member 11.

The temperature sensitive element 21 includes a platinum resistor whose electrical property (electric resistance) changes with temperature. The temperature sensitive element 21 in the present embodiment has the characteristic that its electric resistance increases with temperature (positive characteristic).

Figure 3:
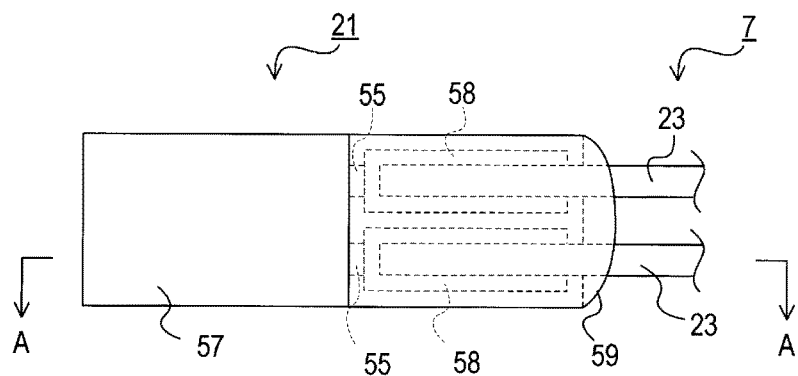
FIG. 3 is a plan view illustrating the external appearance of a temperature sensitive element with sheath conductors of a sheath member connected thereto.
Figure 4:
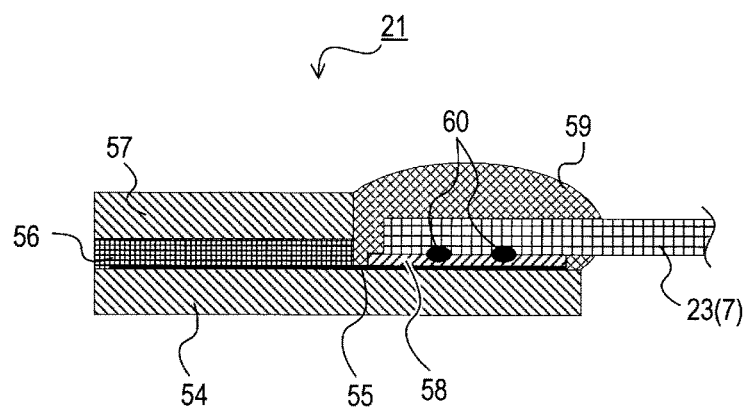
FIG. 4 is a cross-sectional view of the temperature sensitive element, a sheath conductor, and a conductor-fixing material, the cross-sectional view being taken along line A-A in FIG. 3.

FIG. 3 is a plan view illustrating the external appearance of the temperature sensitive element 21 with the sheath conductors 23 of the sheath member 7 connected thereto. FIG. 4 shows a cross-sectional view of the temperature sensitive element 21, one of the sheath conductors 23, and a conductor-fixing material 59, the cross-sectional view being taken along line A-A in FIG. 3. In FIG. 3, part of the temperature sensitive element 21 that is covered with the conductor-fixing material 59 and the sheath conductors 23 are indicated by dotted lines.

The temperature sensitive element 21 includes a ceramic base 54 formed of alumina with a purity of 99.5 to 99.9%; a metallic resistor 55 formed into a prescribed pattern shape (a meandering shape in the present embodiment) on the surface of the ceramic base 54; and a ceramic covering layer 57 that is formed of alumina with a purity of 99.5 to 99.9% and covers the surface of the metallic resistor 55 that is opposite the surface in contact with the ceramic base 54.

The metallic resistor 55 is composed mainly of platinum (Pt) and its electric resistance changes with temperature.

The ceramic covering layer 57 is a fired sheet obtained by firing a ceramic green sheet and is joined to a forward end portion (located on the left side in FIG. 4) of the fired ceramic base 54 through a junction layer 56 so as to cover a forward end portion of the metallic resistor 55.

The junction layer 56 is also formed of alumina with a purity of 99.5 to 99.9%. Before joining, the junction layer 56 is a paste containing alumina powder. The paste is subjected to heat treatment after the fired ceramic base 54 and the ceramic covering layer 57 are laminated through the paste, whereby the junction layer 56 is eventually formed.

Rear end portions (located on the right side in FIG. 4) of the metallic resistor 55 are electrically connected to the sheath conductors 23 of the sheath member 7 through electrode pads 58 that are formed to have a width greater than the width of the conductor traces covered with the ceramic covering layer 57. In this case, the sheath conductors 23 are electrically connected to the electrode pads 58 at welding points 60 by welding such as resistance welding or laser welding.

Then, the junctions between the temperature sensitive element 21 and the sheath conductors 23 are covered with the conductor-fixing material 59, and the temperature sensitive element 21 and the sheath conductors 23 are thereby firmly connected to each other. The conductor-fixing material 59 is formed of a glass material composed mainly of aluminosilicate glass containing components shown in FIG. 5. This aluminosilicate glass has a softening point of 950 [° C.]. This glass material may contain a ceramic material (alumina) as an accessory component.

The thus-configured temperature sensitive element 21 is electrically connected to, for example, an external device through the sheath conductors 23.

As shown in FIG. 2, the temperature sensor 1 further includes cement 39 that fills the space around the temperature sensitive element 21 within a forward end portion of the metal tube 9. The cement 39 filling the space around the temperature sensitive element 21 prevents the temperature sensitive element 21 from vibrating. The cement 39 is formed of an insulating material containing amorphous silica and alumina aggregate.

For example, the threaded portion 15 of the temperature sensor 1 configured as described above is screwed into and fixed to a sensor mounting portion of an exhaust pipe. The forward end of the temperature sensor 1 is thereby disposed inside the exhaust pipe to sense the temperature of the measurement target gas.

In the present embodiment, the temperature of the exhaust gas, which is the measurement target gas, is 800° C. or higher.

1-2. Sheath Member

Next, the detail of the sheath member 7 will be described.

As described above, the sheath member 7 includes the pair of sheath conductors 23 (electrode wires 23), the insulator 24, the cladding member 25, and the two seal members 26 (see FIGS. 1 and 2).

The sheath conductors 23 are formed of a Ni-based alloy containing Al. The forward ends of the sheath conductors 23 are connected to the temperature sensitive element 21 by laser welding, and the rear ends are connected to crimp terminals 27 by resistance welding. In this manner, the sheath conductors 23 are connected at their rear ends to external lead wires 29 for connection with an external circuit (such as an electronic control unit (ECU) of a vehicle) through the crimp terminals 27.

The pair of sheath conductors 23 and also the pair of crimp terminals 27 are electrically insulated from each other by an insulating tube 31. The external lead wires 29 are each a lead wire covered with an insulating cover material and are disposed so as to extend through the inside of a heat resistant rubber-made grommet 33.

The insulator 24 is formed of an insulating material composed of magnesia (MgO) and holds the two sheath conductors 23 while the sheath conductors 23 are electrically insulated from the cladding member 25.

The cladding member 25 is formed of a Ni-based alloy containing Al and formed into a tubular shape that surrounds the insulator 24. The opposite lengthwise ends (the forward end 25a and rear end 25b) of the cladding member 25 are open.

The two seal members 26 are provided as a forward seal member 26a and a rear seal member 26b that seal the open opposite ends (the forward end 25a and rear end 25b) of the cladding member 25. The seal members 26 are formed of the same material as the material of the conductor-fixing material 59, i.e., the glass material formed mainly of aluminosilicate glass, and are formed densely so as not to allow water to permeate. Specifically, the seal members 26 employed in the present embodiment have the same insulation resistance as that of the conductor-fixing material 59 described above.

1-3. Current Paths in Sheath Member and Temperature Sensitive Element

Next, current paths in a forward end region of the sheath member 7 and the temperature sensitive element 21 will be described.

As described above, the seal members 26 employed in the present embodiment have the same insulation resistance as that of the conductor-fixing material 59. In this case, the current flowing through the sheath member 7 and the temperature sensitive element 21 flows through a path represented by a solid line in the upper part of FIG. 6.

Figures 5, 6:
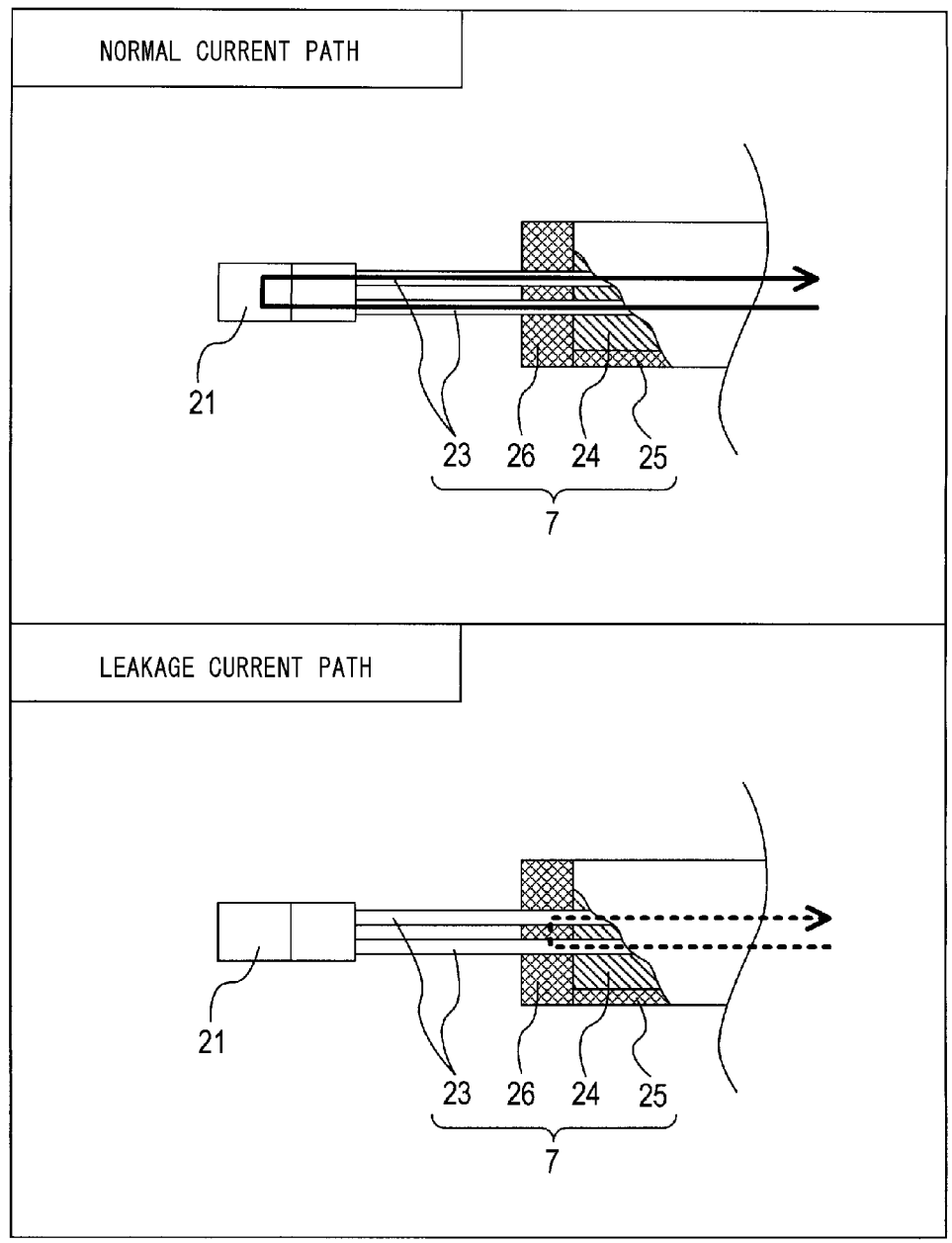
FIG. 5 is a table showing the components and composition ratio of aluminosilicate glass used as the conductor-fixing material in a first embodiment.
FIG. 6 is an illustration illustrating current paths in the forward end region of the sheath member and the temperature sensitive element, a normal current path being illustrated in the upper part of the illustration, a leakage current path being illustrated in the lower part of the illustration.

FIG. 6 is an illustration illustrating current paths in the forward region of the sheath member 7 and the temperature sensitive element 21. A normal current path is illustrated in the upper part of the illustration, and a leakage current path is illustrated in the lower part of the illustration.

If the insulation resistances of the seal members 26 are smaller than the insulation resistance of the conductor-fixing material 59, when a portion in the vicinity of the temperature sensitive element 21 is exposed to high temperature (for example, 600° C. or higher), electric current flows not only through the normal current path including the temperature sensitive element 21 (the path represented by the solid line in the upper part of FIG. 6) but also through the leakage current path via one of the seal members 26 (the path represented by a broken line in the lower part of FIG. 6) over a prescribed time. In this case, the electrical property of the temperature sensitive element 21 cannot be sensed accurately, and this causes a reduction in the sensing accuracy of the temperature sensor 1.

However, in the present embodiment, since the insulation resistances of the seal members 26 are the same as the insulation resistance of the conductor-fixing material 59, the flow of electric current through the leakage current path via one of the seal members 26 (the path represented by the broken line in the lower part of FIG. 6) can be suppressed. Also when the seal members 26 are formed of a material which renders the insulation resistances of the seal members 26 greater than that of the conductor-fixing material 59, the flow of electric current through the leakage current path via one of the seal members 26 can be suppressed.

Therefore, in the temperature sensor 1, the electrical property of the temperature sensitive element 21 can be sensed accurately, and a reduction in the sensing accuracy of the temperature sensor 1 can be restrained.

1-4. Effects

As described above, in the temperature sensor 1 of the present embodiment, the sheath member 7 includes the two seal members 26, and the two seal members 26 seal the open opposite ends (the forward end 25a and rear end 25b) of the cladding member 25, so that water absorption by the insulator 24 of the sheath member 7 can be restrained.

In the present embodiment, the temperature sensitive element 21 has the characteristic that its electric resistance increases with temperature. Therefore, when the temperature sensor 1 is used in a high-temperature environment, the electric resistance of the temperature sensitive element 21 becomes high. In this case, when the insulation resistances of the seal members 26 lower (become lower than the insulation resistance of the conductor-fixing material 59) as the ambient temperature increases, the possibility that the seal members 26 form leakage current paths becomes high.

However, in the temperature sensor 1, the seal members 26 are formed to have the same insulation resistance as that of the conductor-fixing material 59. Therefore, even when the temperature sensitive element 21 is exposed to high temperature, the formation of leakage current paths in the seal members 26 can be suppressed so long as the insulation performance of the conductor-fixing material 59 is maintained at a satisfactory level.

Therefore, in the temperature sensor 1, water absorption by the insulator 24 of the sheath member 7 can be restrained, and the formation of leakage current paths in the insulator 24 and the seal members 26 can thereby be suppressed, so that a reduction in the accuracy of temperature sensing can be restrained.

In the temperature sensor 1, the insulator 24 of the sheath member 7 is formed of magnesia (MgO). Magnesia has the characteristic that it easily absorbs water. Therefore, the insulation resistance of the insulator 24 formed of magnesia is likely to lower as a result of absorption of water.

However, the temperature sensor 1 is provided with the two seal members 26, so that water absorption by the insulator 24 of the sheath member 7 can be restrained. Therefore, the formation of a leakage current path in the insulator 24, which occurs when the insulator 24 absorbs water, can be suppressed, and the electrical property of the temperature sensitive element 21 can be sensed accurately.

In the temperature sensor 1, the seal members 26 of the sheath member 7 are formed of the same glass material as the glass material for the conductor-fixing material 59 that is composed mainly of aluminosilicate glass.

The glass material resists water permeation. Therefore, by covering the open opposite ends (the forward end 25a and rear end 25b) of the cladding member 25 with the glass material, water absorption by the insulator 24 can be restrained. By controlling the components forming the glass material, the insulation resistance of the insulator 24 can be controlled to be equal to or greater than the insulation resistance of the conductor-fixing material 59.

In the temperature sensor 1, the sheath member 7 is supported by the mounting member 11 with the forward end 25a of the cladding member 25 disposed forward of the contact surface 35a of the mounting member 11 and the rear end 25b of the cladding member 25 disposed rearward of the contact surface 35a of the mounting member 11. Among the two seal members 26 (the forward seal member 26a and the rear seal members 26b), the forward seal member 26a disposed at the forward end of the cladding member 25 is formed of a material having the same resistivity as that of the material of the rear seal member 26b disposed at the rear end of the cladding member 25.

The temperature sensor 1 is configured such that external heat received by its forward end is transferred to an external member through the contact surface 35a of the mounting member 11. Therefore, the temperature of the temperature sensor 1 in a region located rearward of the mounting member 11 is lower than that in a region located forward of the mounting member 11.

Specifically, the temperature of a portion of the temperature sensor 1 located forward of the mounting member 11 is higher than the temperature of a portion of the temperature sensor 1 located rearward of the mounting member 11. Therefore, among the two seal members 26, the forward seal member 26a is disposed in a higher-temperature environment than the rear seal member 26b.

However, since the forward seal member 26a among the two seal members 26 is formed to have the same insulation resistance as that of the rear seal member 26b, the formation of a leakage current path in the forward seal member 26a disposed in the higher-temperature environment can be suppressed.

Therefore, in the present temperature sensor 1, the formation of leakage current paths in the seal members 26 can be suppressed, and a reduction in the accuracy of temperature sensing can be restrained. The effect of preventing a reduction in the accuracy of temperature sensing is obtained also when the forward seal member 26a is formed of a material having an insulation resistance greater than that of the material of the rear seal member 26b. The insulation resistance may be controlled by controlling the components forming the glass.

1-5. Correspondence With Claims

A description will be given of the correspondence between terms used in the present embodiment and terms used in claims.

Each of the sheath conductors 23 corresponds to the conductor in the claims. Each of the welding points 60 between the electrode pads 58 of the temperature sensitive element 21 and the sheath conductors 23 corresponds to the junction in the claims. The insulator 24 corresponds to the insulator in the claims. The cladding member 25 corresponds to the cladding member in the claims. The conductor-fixing material 59 corresponds to the covering member in the claims.

2. OTHER EMBODIMENTS

One embodiment of the present invention has been described, but the present invention is not limited to the above-described embodiment. The present invention can be implemented in various forms without departing from the spirit of the invention.

For example, in the above-described embodiment, the temperature sensitive element (specifically the electrode pads) is connected directly to the conductors of the sheath member. However, the temperature sensitive element (specifically the electrode pads) may be connected to the conductors of the sheath member through other members.

Figure 7:
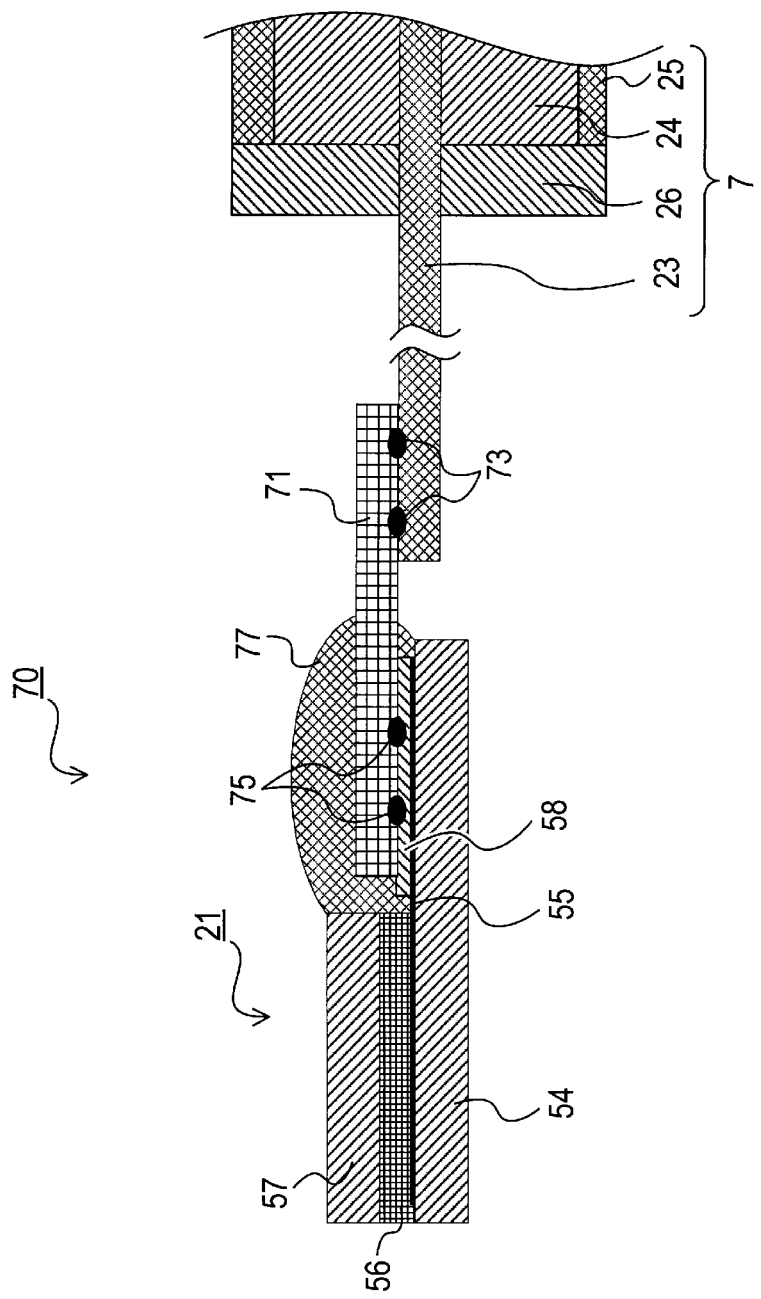
FIG. 7 is a cross-sectional view of a second temperature sensor, illustrating the structure of a portion in which the temperature sensitive element is connected to the conductors of the sheath member through lead wires.

Specifically, as in the case of a second temperature sensor 70 shown in FIG. 7, the electrode pads 58 of the temperature sensitive element 21 may be connected to the sheath conductors 23 of the sheath member 7 through lead wires 71 formed of platinum or a platinum alloy.

FIG. 7 is a cross-sectional view of the second temperature sensor 70, illustrating the structure of a portion in which the temperature sensitive element 21 is connected to the sheath conductors 23 of the sheath member 7 through the lead wires 71. Components of the second temperature sensor 70 which are the same as those of the temperature sensor 1 of the first embodiment are denoted by the same reference numerals.

The lead wires 71 are welded to the sheath conductors 23 of the sheath member 7 at welding points 73 and welded to the electrode pads 58 of the temperature sensitive element 21 at welding points 75.

The junctions between the electrode pads 58 of the temperature sensitive element 21 and the lead wires 71 are covered with a lead-fixing material 77. By providing the lead-fixing material 77, the temperature sensitive element 21 and the lead wires 71 are firmly connected to each other.

The lead-fixing material 77 is composed of a glass material formed mainly of aluminosilicate glass including the components shown in FIG. 5. This aluminosilicate glass has a softening point of 950 [° C.].

In the second temperature sensor 70, as in the temperature sensor 1 of the first embodiment, the sheath member 7 is provided with the seal members 26, and the two seal members 26 seal the open opposite ends (the forward end 25a and rear end 25b) of the cladding member 25. The seal members 26 are formed of a material composed mainly of glass, and the insulation resistances of the seal members 26 are equal to or greater than the insulation resistance of the lead-fixing material 77.

In the above-described second temperature sensor 70, as in the temperature sensor 1 of the first embodiment, since the two seal members 26 seal the open opposite ends (the forward end 25a and rear end 25b) of the cladding member 25, water absorption by the insulator 24 of the sheath member 7 can be restrained.

Since the seal members 26 are formed so as to have an insulation resistance equal to or greater than that of the lead-fixing material 77, the formation of leakage current paths in the seal members 26 can be suppressed.

Therefore, in the second temperature sensor 70, water absorption by the insulator 24 of the sheath member 7 can be restrained, and the formation of leakage current paths in the insulator 24 and the seal members 26 can be suppressed, so that the electrical property of the temperature sensitive element 21 can be sensed accurately.

Therefore, even when the second temperature sensor 70 is used in a high-temperature environment, a reduction in the accuracy of temperature sensing can be restrained.

A description will be given of the correspondence between terms used in the present embodiment and terms used in the claims. Each of the sheath conductors 23 corresponds to the conductor in the claims. Each of the welding points 75 between the lead wires 71 and the electrode pads 58 of the temperature sensitive element 21 corresponds to the junction in the claims. The insulator 24 corresponds to the insulator in the claims. The cladding member 25 corresponds to the cladding member in the claims. The lead-fixing material 77 corresponds to the covering member. Each of the lead wires 71 corresponds to the another member that electrically connects the temperature sensitive element to the conductor.

In the first embodiment described above, the insulator 24 of the sheath member 7 is formed of magnesia. However, the insulator is not limited to magnesia and may be formed of an insulating material such as silica.

In the first embodiment described above, the seal members 26 are formed of a material composed mainly of glass. However, the material of the seal members is not limited to the material composed mainly of glass. The seal members may be formed of a ceramic material such as alumina, spinel, cordierite, mullite, steatite, silicon carbide, or silicon nitride; or a water-repellent ceramic material.

In the embodiment described above, the temperature sensor has a temperature sensitive element including a platinum resistor. However, the temperature sensor may have a different type of temperature sensitive element. Specifically, a thermistor element including a conductive oxide sintered body may be used as the temperature sensitive element.

A second temperature sensitive element 61, which is a thermistor element, will next be described.

Figure 8:
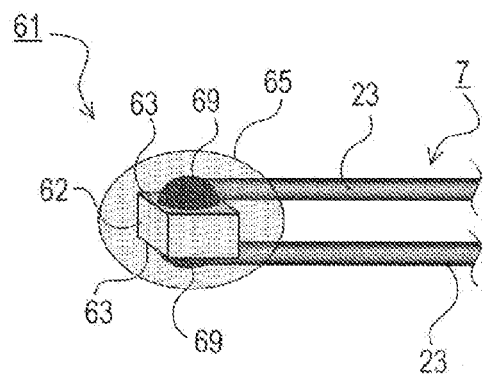
FIG. 8 is a perspective view illustrating the external appearance of a second temperature sensitive element with the sheath conductors of the sheath member connected thereto.

FIG. 8 is a perspective view illustrating the external appearance of the second temperature sensitive element 61 joined to the sheath conductors 23 of the sheath member 7.

The second temperature sensitive element 61 includes an element main body 62 and two electrode portions 63. The element main body 62 is formed mainly of a conductive oxide sintered body whose electrical property (electric resistance) changes with temperature. The two electrode portions 63 are formed on the upper and lower surfaces of the element main body 62.

The two electrode portions 63 are joined to the sheath conductors 23 of the sheath member 7 using an electrically conductive paste. A covering member 65 composed mainly of glass is formed so as to cover part of the sheath conductors 23 and the entire second temperature sensitive element 61 including junctions 69 between the electrode portions 63 and the sheath conductors 23.

The sheath member 7 in the present embodiment (third embodiment) has the same structure as that of the sheath member 7 in the first embodiment described above.

The second temperature sensitive element 61 connected to the sheath conductors 23 of the sheath member 7 in the manner described above is accommodated in the metal tube 9 in the same manner as that for the temperature sensitive element 21, whereby a temperature sensor can be configured.

In this temperature sensor, as in the temperature sensor 1 of the first embodiment, the two seal members 26 seal the open opposite ends (the forward end 25a and rear end 25b) of the cladding member 25, and therefore a reduction in the accuracy of temperature sensing can be restrained. The seal members 26 have an insulation resistance equal to or greater than that of the covering member 65.

In the above embodiments, the sheath member is configured such that the seal members 26 are disposed outside the cladding member 25. However, the sheath member may be configured such that the seal members are disposed inside the cladding member. For example, a second sheath member 107 shown in FIG. 9 has a structure in which inner seal members 126 are disposed inside the forward and rear end portions of the cladding member 25.

Figure 9:
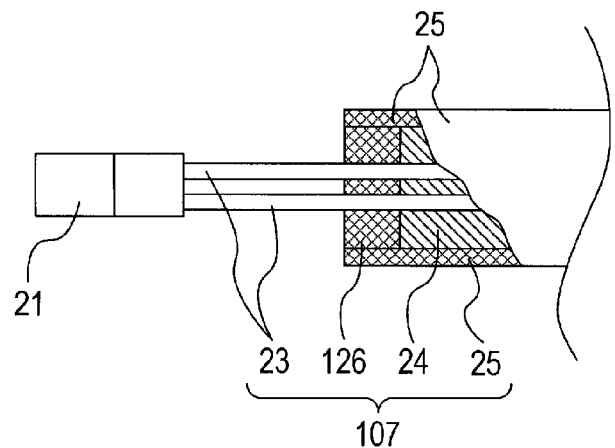
FIG. 9 is an illustration illustrating the configuration of part of a forward end portion of a second sheath member, the forward end portion being connected to the temperature sensitive element.

The second sheath member 107 includes the pair of sheath conductors 23 (electrode wires 23), the insulator 24, the cladding member 25, and the two inner seal members 126. In FIG. 9, the forward end portion of the second sheath member 107 that is connected to the temperature sensitive element 21 is partially shown, and only one of the two inner seal members 126 that is located on the forward end side is shown. Components of the second sheath member 107 which are the same as those of the sheath member 7 of the first embodiment are denoted by the same reference numerals.

The seal members may be disposed inside and outside the cladding member. For example, a third sheath member 108 shown in FIG. 10 includes a two-section seal member 127 which has an inner section-forming portion 127a disposed inside the cladding member and an outer section-forming portion 127b disposed outside the cladding member and which is formed as a single member. Two-section seal members 127 are disposed at the forward and rear ends of the cladding member 25.

Figure 10:
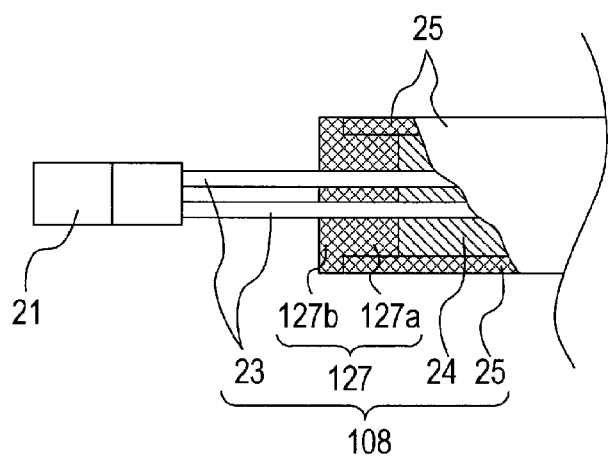
FIG. 10 is an illustration illustrating the configuration of part of a forward end portion of a third sheath member, the forward end portion being connected to the temperature sensitive element.

The third sheath member 108 includes the pair of sheath conductors 23 (electrode wires 23), the insulator 24, the cladding member 25, and the two two-section seal members 127. In FIG. 10, the forward end portion of the third sheath member 108 that is connected to the temperature sensitive element 21 is partially shown, and only one of the two two-section seal members 127 that is located on the forward end side is shown. Components of the third sheath member 108 which are the same as those of the sheath member 7 of the first embodiment are denoted by the same reference numerals.

In the temperature sensors described in the above embodiments, the covering members (the conductor-fixing material 59 and the lead-fixing material 77) are formed of a glass material composed mainly of aluminosilicate glass including the components shown in FIG. 5. However, the covering members may be formed of a different glass material.

For example, the covering members may be formed of silicate glass, borate glass, borosilicate glass, or phosphosilicate glass.

The silicate glass is a glass material containing $SiO_2$ and further containing any of alkaline-earth metal oxides (MgO, CaO, BaO, and SrO). The borate glass is a glass material containing $B_2O_3$ and further containing any of alkaline-earth metal oxides (MgO, CaO, BaO, and SrO). The borosilicate glass is a glass material containing $B_2O_3$ and $SiO_2$ and further containing any of alkaline-earth metal oxides (MgO, CaO, BaO, and SrO). The phosphosilicate glass is a glass material containing $P_2O_5$ and $SiO_2$ and further containing any of alkaline-earth metal oxides (MgO, CaO, BaO, and SrO).

The aluminosilicate glass is a glass material containing $SiO_2$ and $Al_2O_2$ and further containing any of alkaline-earth metal oxides (MgO, CaO, BaO, and SrO).

When a material containing substantially no alkaline-earth elements that deteriorate insulating properties (their content is, for example, 0.2 wt % or less) is used as the glass material for the covering members (the conductor-fixing material and the lead-fixing material), deterioration of the insulating properties can be restrained.

The covering members (the conductor-fixing material 59 and the lead-fixing material 77) composed mainly of glass may further contain a ceramic material. The ceramic material contained is not limited to alumina. Examples of the ceramic material include spinel, cordierite, mullite, steatite, zircon, silicon carbide, silicon nitride, and aluminum nitride.

DESCRIPTION OF REFERENCE NUMERALS

1: temperature sensor
7: sheath member
9: metal tube (housing)
11: mounting member
21: temperature sensitive element
23: sheath conductor (electrode wire)
24: insulator
25: cladding member
25a: forward end
25b: rear end
26: seal member
26a: forward seal member
26b: rear seal member
35: protruding portion
35a: contact surface
37: rear sheath portion
58: electrode pad
59: conductor-fixing material
61: second temperature sensitive element
63: electrode portion
70: second temperature sensor
71: lead wire
77: lead-fixing material

What is claimed is:

1. A temperature sensor comprising:
a temperature sensitive element having an electrical property that changes with temperature;
a sheath member including at least one conductor extending in a lengthwise direction of the temperature sensor and is electrically connected to the temperature sensitive element directly or through another member, an insulator formed of an insulating material and surrounding the at least one conductor, a metallic cladding member covering the insulator and open at opposite ends in the lengthwise direction, and seal members sealing the open opposite ends of the metallic cladding member with the at least one conductor extending outward from the metallic cladding member through the seal members; and
a covering member formed mainly of glass and covering a junction between the at least one conductor and the temperature sensitive element or a junction between the another member and the temperature sensitive element,
wherein:
an electric resistance of the temperature sensitive element increases with the temperature, and
an insulation resistance of the seal members is equal to or greater than an insulation resistance of the covering member.

2. A temperature sensor according to claim 1, wherein the insulator of the sheath member is formed of magnesia (MgO).

3. A temperature sensor according to claim 1, wherein the seal members of the sheath member are formed mainly of glass.

4. A temperature sensor according to claim 1, further comprising a mounting member supporting the sheath member and including a contact surface for contacting an external member,
wherein,
in the lengthwise direction of the temperature sensor, a side on which the temperature sensitive element is disposed is defined as a forward end side and a side opposite the forward end side is defined as a rear end side,
the mounting member holds the sheath member such that a forward end of the metallic cladding member is disposed forward of the contact surface of the mounting member and that a rear end of the metallic cladding member is disposed rearward of the contact surface of the mounting member,
the seal members include a forward seal member disposed at the forward end of the metallic cladding member and a rear seal member disposed at the rear end of the metallic cladding member, and
an insulation resistance of the forward seal member is equal to or greater than an insulation resistance of the rear seal member.

* * * * *